Nov. 14, 1961 K G. SMACK 3,008,859
METHOD OF MAKING CLOSED SHAPES OF REINFORCED PLASTIC
Filed Nov. 3, 1958 3 Sheets-Sheet 1
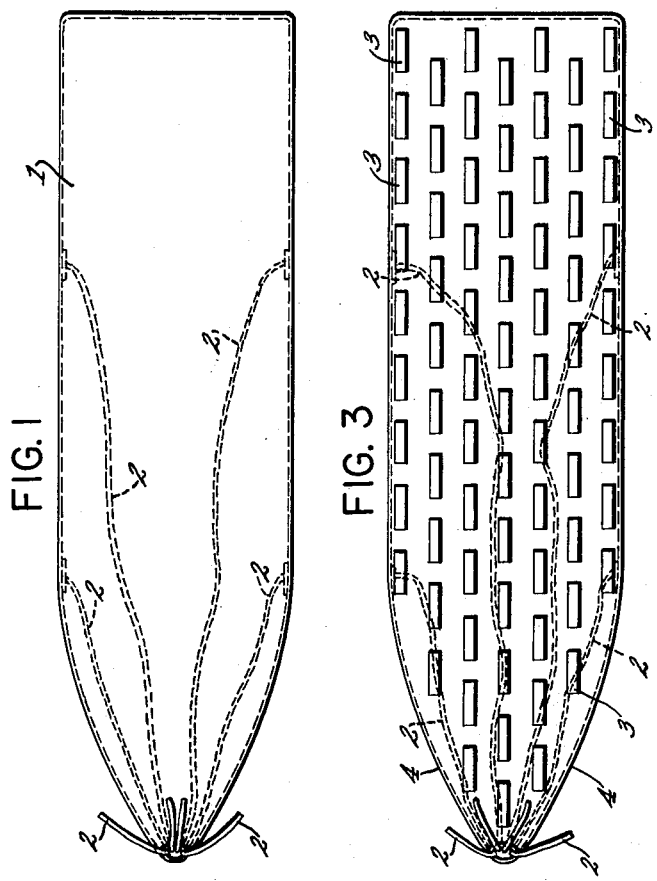
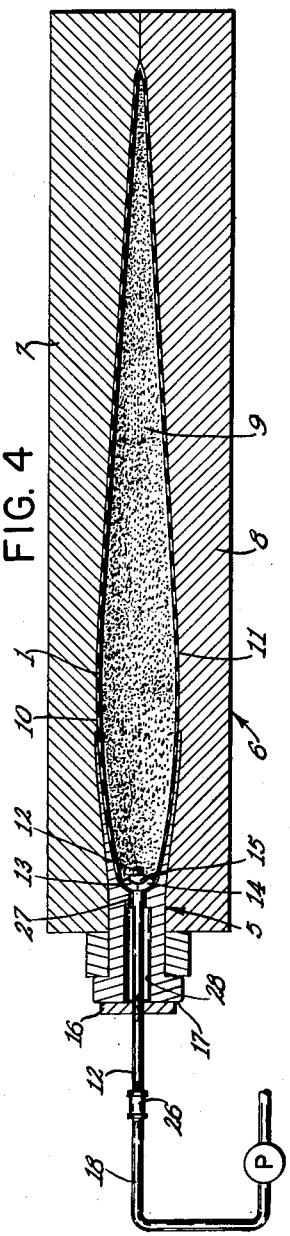
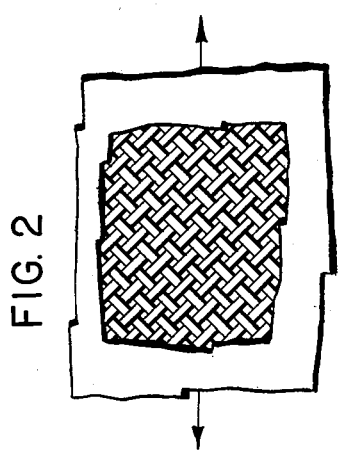
INVENTOR.
KENNETH G. SMACK
BY William V. Els
ATTORNEY Nov. 14, 1961 K G. SMACK 3,008,859
METHOD OF MAKING CLOSED SHAPES OF REINFORCED PLASTIC
Filed Nov. 3, 1958 3 Sheets-Sheet 2
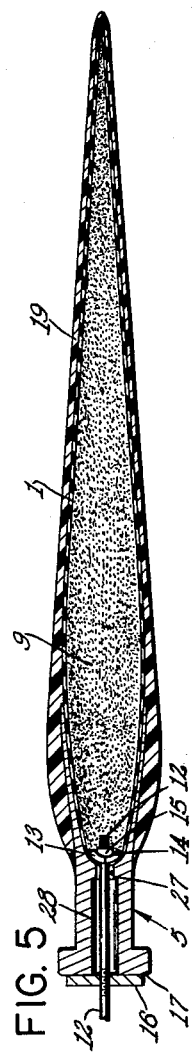
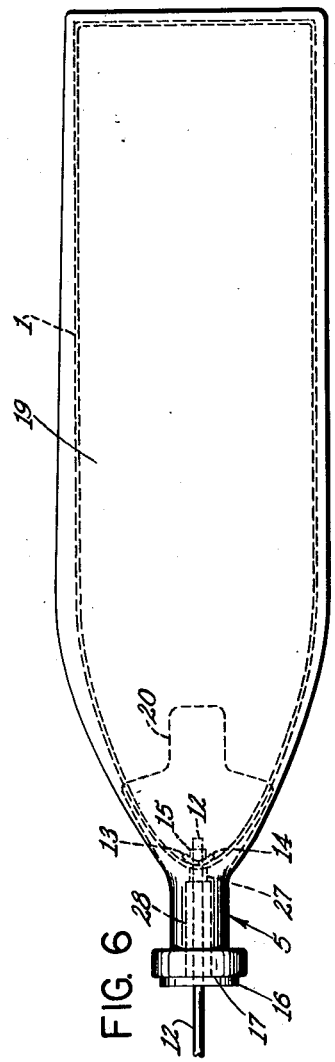
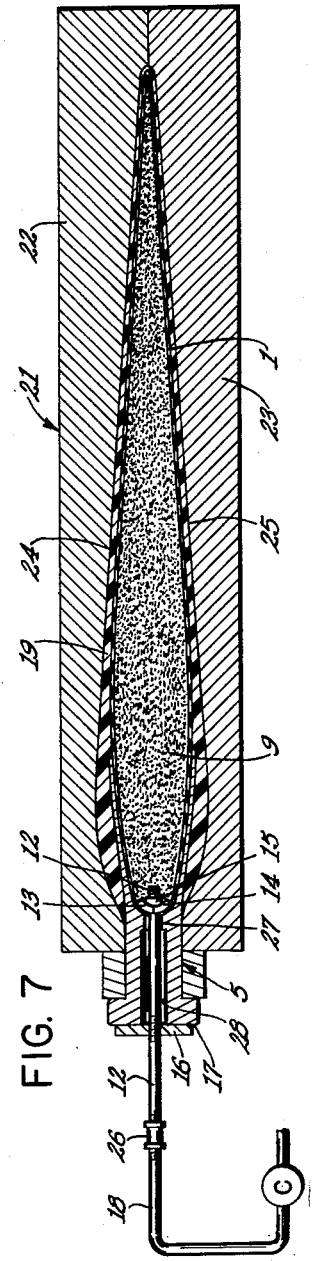
INVENTOR.
KENNETH G. SMACK
BY
ATTORNEY Nov. 14, 1961   K G. SMACK   3,008,859
METHOD OF MAKING CLOSED SHAPES OF REINFORCED PLASTIC
Filed Nov. 3, 1958   3 Sheets-Sheet 3

INVENTOR.
KENNETH G. SMACK
BY
*William V. Ebs*
ATTORNEY

United States Patent Office 3,008,859
Patented Nov. 14, 1961

3,008,859
METHOD OF MAKING CLOSED SHAPES OF REINFORCED PLASTIC
Kenneth G. Smack, Maywood, N.J., assignor to Curtiss-Wright Corporation, a Delaware corporation
Filed Nov. 3, 1958, Ser. No. 771,316
8 Claims. (Cl. 156—79)

My invention relates to an improved method of making closed shapes of reinforced plastic. The invention has particular application to the manufacture of propeller blades for aircraft, but is not necessarily limited thereto.

Well-known conventional techniques are applicable to the production of many parts of reinforced plastic. Special techniques are, however, utilized in the production of closed shapes, the term "closed" as used herein being applied to those shapes which substantially enclosed a region of space, but have openings through which access to the interior of the part may be gained.

Closed shapes of reinforced plastic may be produced with an extractable mandrel of one sort or another, as for example, a breakaway mandrel of plaster, which may be withdrawn from the interior of a part in pieces providing access to the mandrel may be had for the purpose of breaking it apart, and the piece is not so complicated as to prevent removal of the broken pieces from all of the nooks and crannies of the part being produced. However, no known technique has so far proved entirely satisfactory in the production of closed shapes. In present techniques no suitable provision is made for pressurizing the resin impregnated material, which is used in the formation of the part, against the sides of a mold to obtain accurate conformance of the product to desired dimensions, and consolidation of the resin and reinforcement such as to result in a low void, high quality uniform product. It is a prime object of the invention to achieve this desired result in the production of closed shapes of reinforced plastic.

In carrying out the invention, resin impregnated reinforcing material utilized in forming a closed shape is pressurized against the sides of a mold by means of an expandable bag defining the peripheral wall of a mandrel. A mandrel of the type shown in Patent No. 2,488,922 of W. J. Mead, issued November 22, 1949, is particularly suitable for use in accomplishing the desired objective, such a mandrel comprising a granular filled expandable bag having the characteristic of becoming rigid upon evacuation of air from the bag. The detailed description which follows describes the manner in which this bag may be utilized in producing a propeller blade of reinforced plastic. It will be appreciated, however, that other types of extractable mandrels having an expandable peripheral wall may also be utilized in the production of a propeller blade, and other closed shapes as well. An example of such a mandrel would be one having the said expandable wall, and a core of a material which is solid at room temperatures, but which may be readily melted out of a formed part.

Referring to the drawings:

FIG. 1 is a plan view of an expandable bag for use in molding a propeller blade of reinforced plastic;

FIG. 2 is a plan view showing a possible construction for an expandable bag;

FIG. 3 is a plan view of a bag such as shown in FIG. 1 having reinforcing strips secured thereon;

FIG. 4 is a vertical sectional view of an assembled blade shank and mandrel located in a mold used in shaping the mandrel to the form of the airfoil portion of a propeller blade;

FIG. 5 is a vertical sectional view of the blade shank and mandrel of FIG. 4 laid up with resin impregnated reinforcing material;

FIG. 6 is a plan view of the laid up shank and mandrel of FIG. 5;

FIG. 7 is a vertical sectional view showing the laid up shank and mandrel of FIGS. 5 and 6 in a mold wherein the laid up material is molded to form under pressure;

Figure 8:
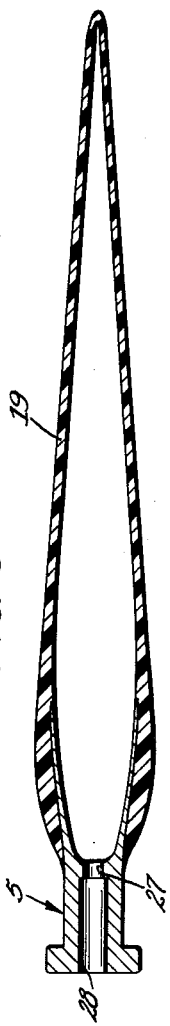
FIG. 8 is a vertical sectional view showing the molded form with the mandrel removed.
Figure 9:
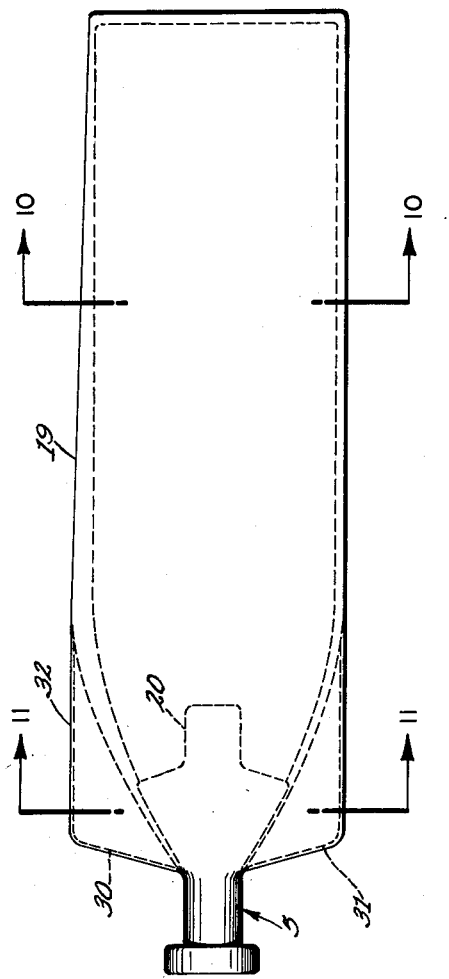
FIG. 9 is a plan view of a completed propeller blade.
Figure 10:
FIG. 10 is a sectional view taken on the plane of the line 10—10 of FIG. 9.
Figure 11:
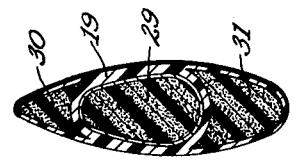
FIG. 11 is a sectional view taken on the plane of the line 11—11 of FIG. 9.

In the drawings reference character 1 designates a bag of sheet rubber having the general configuration of a propeller blade less the blade shank and cuffs. Such bag serves as the outer peripheral wall of a mandrel used in producing the blade shape of reinforced plastic. In general any suitable expandable construction may be employed for the bag, and the bag may have any desired configuration generally corresponding to the shape of a part which is to be produced. A suitable bag, for example, may be formed by weaving the bag shape with elastic or crimped thread and coating the woven product with rubber. A bag formed of a loosely woven fabric which has been coated with rubber might also be used. Such a bag might be woven in the manner as shown in FIG. 3 such that the fabric may be stretched and the bag expanded by forces acting diagonally relative to the threads of the weave as shown in FIG. 3. If desired a knitted, rubber coated construction could be used.

The bag 1 is provided with pull strings 2, to facilitate removal from a molded form. In this connection it is desirable that the walls of the bag be as thin as possible since undue thickness would hamper withdrawal of the bag through a small opening. With a mandrel of the type shown in the aforementioned Patent No. 2,488,922 and described in detail therein, if the bag wall is made unduly thin the mandrel will have a tendency to bend. By reinforcing the bag wall with fabric strips 3, as shown in FIG. 3, over-all thickness of the wall may be reduced and sufficient rigidity of the mandrel maintained.

The bag 1 is utilized in forming a mandrel for the airfoil portion of the blade by first assembling the converging end 4 of the bag in a blade shank 5 particularly adapted to receive the bag, and then causing the bag to assume the general configuration of the airfoil portion of the blade in a mold 6 having separable parts 7 and 8. The bag, while in the mold, is filled with granules 9 until the outside wall of the bag is supported by the granules against the mold walls 10 and 11 and also against the inside of the shank as shown. Preferably the bag in a collapsed condition, before insertion in the mold 6, is of such size that some expansion of the bag material is required to conform the bag to the mold walls 11 and 12. The granules which are used to fill the bag may be admitted to the bag through the length of pipe 12 which enters the bag at its converging end. During the filling process the mold may be shaken to assure that all portions of the outer surface of the bag contact the mold walls such that no voids are left in the bag after filling. Alternatively, the bag may be maintained under pressure so that the bag wall bears against the mold walls during the filling process.

As shown, the bag is assembled to the shank in mold 6 by means including the length of pipe 12, split rubber washers 13 and 14, and the nut 15 threaded on the pipe. A plate 16 threaded on the pipe and bearing against face 17 of the shank exerts a pulling force on pipe length 12 causing nut 15 to press the converging end of the bag through the washers 13 and 14 against the shank.

After the bag has been filled with granules, the pipe length 12 is connected to a pump (P) in the line 18 and a vacuum is drawn on the bag causing it to become rigid. The assembled shank and mandrel are removed from the mold while the vacuum is maintained. Resin impregnated reinforcing material 19 is laid up over the mandrel and a portion of the shank, as shown in FIG. 5. Fibrous glass reinforcing material is particularly suitable for use in this lay up operation. A plurality of layers of the reinforcing material are utilized according to the thickness desired at any particular location. A greater thickness of material is laid up over the adjoining regions of the mandrel and shank than elsewhere to prevent structural failure in this region. In this connection it will be noted (FIG. 6) the shank is formed with ears 20 which extend some distance into the airfoil portion of the blade, and serve to strengthen the joint between the shank and remaining portion of the propeller blade.

After the resin impregnated material has been laid up over the assembled shank and mandrel, the structure is placed in a mold 21 (FIG. 7) having separable parts 22 and 23 with walls 24 and 25 respectively which accurately define a structural configuration for the outside surface of the propeller blade. The pipe line 18 is disconnected from pump (P) and then connected to a compressor (C) which is used to pressurize the bag so as to expand the bag wall outwardly and force the laid up material against the mold walls. The laid up material is in this manner caused to assume the configuration of the mold walls, and because of the pressure to which it is subjected compactness of the resin and reinforcing material is obtained. The resin impregnated material is cured in the mold under pressure for a suitable period of time at a selected temperature.

After curing, pressure on the bag is relieved. The pipe length 12 is disconnected from pipe line 18 at coupling 26 and from the nut 15 whereupon pipe length 12 is withdrawn from the shank. The nut 15 and split washers 13 and 14 are removed from the bag through opening 27 which is of sufficient size to permit the withdrawal of these parts. After the removal of all parts from the bag, the bag is removed from the molded form through the openings 27 and 28 in the shank. The pull strings 2, which have been shown in FIGS. 2 and 3, but which have been omitted from other figures of the drawings for reasons of clarity, are used to pull the bag inside out and through openings 27 and 28. In the alternative the bag 1 may be left in place in adherence to the plastic reinforced material. Pull strings are not required in such event. When removal of the bag is contemplated the bag is coated with a suitable mold release compound at the outset of the process, that is before insertion in the mold 6. No mold release compound is used where the bag is to remain in place in the molded form.

The molded form is taken from the mold as a hollow propeller blade (FIG. 8). For the purpose of structurally supporting the airfoil portion of the blade, the blade form may be provided with a foam plastic core 29. Preferably this is accomplished by reacting the ingredients of a foam plastic within the blade such that the reaction product solidifies therein and becomes intimately bonded to the inner surface of the molded skin of the blade. Foam plastic cuffs 30 and 31 are molded in place over the plastic reinforced material of the blade causing the cuff material to also become intimately bonded to the blade skin 19. Resin impregnated reinforcing material 32 is laid up over the cuffs and faired into the blade skin 19.

While I have described the preferred manner of carrying out the invention, it will, of course, be understood that various changes and modifications, some of which have been indicated, may be made in carrying out the invention without departing from the spirit and scope of the invention. I intend to cover all such changes and modifications in the claims.

I claim:

1. A method of making a hollow shape which shall substantially enclose a region of space and have only a relatively small opening through which access to the interior of the shape may be gained, said method comprising the steps of providing a mandrel having the general configuration of the shape to be formed, the mandrel being a granular filled bag from which the air has been evacuated, said mandrel having an expandable peripheral wall; covering the mandrel with resin impregnated reinforcing material; placing the covered mandrel in a mold defining a desired outside contour for the shape; applying pressure to the mandrel to expand the peripheral wall and force the resin impregnated material against the mold walls; curing the molded form; and removing the granules from the bag, the bag from the molded form, and the molded form from the mold.

2. A method of making a substantially enclosed shape of reinforced plastic as set forth in claim 1 wherein the ingredients of a foam plastic are reacted in the molded form after removal of the mandrel, the reaction product solidifying into a unitary mass in bonded relation with the molded form.

3. A method of making a hollow shape which shall substantially enclose a region of space and have only a relatively small opening through which access to the interior of the shape may be gained comprising the steps of providing a mandrel having the general configuration of the shape to be formed, the mandrel being a granular filled bag from which the air has been evacuated, said mandrel having an expandable peripheral wall; covering the mandrel with resin impregnated reinforcing material; placing the covered mandrel in a mold defining a desired outside contour for the shape; applying pressure to the mandrel to expand the peripheral wall and force the resin impregnated material against the mold walls; curing the molded form; removing only the granules from the molded form leaving the bag in place to constitute a portion of the finished structure, and removing the molded shape from the mold.

4. A method of making a hollow propeller blade including a shank, the blade to be an enclosed structure except for a relatively small opening defined by the shank, said method comprising the steps of providing a mandrel having the general configuration of the airfoil portion of a blade in assembled relation with the blade shank, the mandrel being a granular filled bag of expandable construction from which air has been evacuated; covering the assembled portions, except part of the shank with resin impregnated reinforcing material; locating the covered parts in a mold defining a desired outside contour for the propeller blade; applying pressure to the bag to force the resin impregnated material against the mold walls; curing the molded form; and removing the granules from the bag and the molded form from the mold.

5. A method of making a hollow propeller blade as set forth in claim 4 wherein the bag is removed from the molded form after the granules have been removed from the bag.

6. A method of making a propeller blade including a shank, the blade to be an enclosed structure except for a relatively small opening defined by the shank, said method comprising the steps of providing a mandrel having the general configuration of the airfoil portion of the blade, the mandrel being a granular filled bag from which the air has been evacuated, said mandrel having an expandable peripheral wall; covering the airfoil portion of the blade and the blade shank secured thereto, with resin impregnated reinforcing material; locating the covered parts in a mold defining a desired outside contour for the propeller blade; applying pressure to the mandrel to expand the peripheral wall and force the resin impregnated material against the mold walls; curing the molded form; removing the granules from the bag, the bag from the molded form and the molded form from the bag; and reacting the ingredients of a foam plastic in the molded form, the reaction product solidifying into a unitary mass in bonded relation with the molded form.

7. A method of making a propeller blade as set forth in claim 6 with the additional steps of forming foam plastic cuffs on the molded form, and covering the cuffs and adjoining areas of the form with more resin impregnated reinforcing material.

8. The method of making a hollow propeller blade as set forth in claim 4 wherein the assembled shank and mandrel are covered with a greater number of layers of resin impregnated material in adjoining regions of the shank and mandrel than elsewhere.

References Cited in the file of this patent

UNITED STATES PATENTS

| | | |
|---|---|---|
| 1,149,669 | Mauersberger | Aug. 10, 1915 |
| 1,348,332 | Stremel | Aug. 3, 1920 |
| 2,175,204 | Lougheed | Oct. 10, 1939 |
| 2,182,812 | Lougheed | Dec. 12, 1939 |
| 2,202,042 | Blount | May 28, 1940 |
| 2,265,366 | Hafner | Dec. 9, 1941 |
| 2,312,332 | Gramelspacher | Mar. 2, 1943 |
| 2,343,005 | Gardner | Feb. 29, 1944 |
| 2,484,141 | Alex | Oct. 11, 1949 |
| 2,485,898 | Mathews et al. | Oct. 25, 1949 |
| 2,488,922 | Mead | Nov. 22, 1949 |
| 2,589,786 | Engel | Mar. 18, 1952 |
| 2,618,014 | Sawyer | Nov. 18, 1952 |
| 2,648,388 | Haines | Aug. 11, 1953 |
| 2,728,702 | Simon | Dec. 27, 1955 |
| 2,767,436 | Noland | Oct. 23, 1956 |
| 2,841,826 | Brucker | July 8, 1958 |
| 2,877,503 | Pudenbaugh et al. | Mar. 17, 1959 |